(12) United States Patent
Barthold et al.

(10) Patent No.: US 7,791,215 B2
(45) Date of Patent: Sep. 7, 2010

(54) INTRA-BUNDLE POWER LINE CARRIER CURRENT SYSTEM

(76) Inventors: Lionel O. Barthold, 10 Wood's Point La., Lake George, NY (US) 12845; Dennis A. Woodford, 372 Oak Street, Winnipeg, Manitoba (CA) R5M 3R5

( * ) Notice: Subject to any disclaimer, the term of this patent is extended or adjusted under 35 U.S.C. 154(b) by 440 days.

(21) Appl. No.: 11/869,079

(22) Filed: Oct. 9, 2007

(65) Prior Publication Data
US 2008/0084937 A1   Apr. 10, 2008

Related U.S. Application Data

(60) Provisional application No. 60/828,803, filed on Oct. 10, 2006.

(51) Int. Cl.
   *H02J 3/02*   (2006.01)
(52) U.S. Cl. .................... 307/3; 307/DIG. 1
(58) Field of Classification Search .............. 307/3, 307/DIG. 1; 174/42, 146; 340/310.11; 375/257; 248/58, 61
See application file for complete search history.

(56) References Cited

U.S. PATENT DOCUMENTS

| | | | |
|---|---|---|---|
| 3,815,054 A * | 6/1974 | McClure et al. ........ 333/5 |
| 3,925,595 A * | 12/1975 | Hawkins ............... 174/42 |
| 4,065,763 A * | 12/1977 | Whyte et al. ............ 307/3 |
| 4,158,185 A * | 6/1979 | Dageforde et al. ..... 333/243 |
| 5,444,184 A | 8/1995 | Hassel |
| 5,523,528 A * | 6/1996 | Bese et al. ............ 174/36 |
| 6,288,631 B1 | 9/2001 | Shinozaki et al. |
| 6,727,604 B2 * | 4/2004 | Couture ............... 307/112 |
| 7,564,341 B2 * | 7/2009 | Brandt et al. ....... 340/310.11 |
| 2003/0168229 A1 | 9/2003 | Whidden |
| 2005/0189135 A1 | 9/2005 | Clark |
| 2006/0103238 A1 * | 5/2006 | Enders et al. .......... 307/10.1 |
| 2006/0145834 A1 | 7/2006 | Berkman et al. |

* cited by examiner

*Primary Examiner*—Albert W Paladini
*Assistant Examiner*—Daniel Cavallari
(74) *Attorney, Agent, or Firm*—Brian M. Dingman; Mirick, O'Connell, DeMallie + Lougee, LLP

(57) ABSTRACT

A system including associated equipment for transmitting radio-frequency power line carrier signals on high voltage ac or dc transmission lines within a multi-conductor bundle, one path for which is provided by one or more conductors located at the center of the bundle, and the other by the remaining conductors connected in electrical parallel and arrayed in a generally circular pattern around the center. Insulated conductor spacers hold the conductors in their symmetrical configuration and insulate the center conductor, allowing it to serve as a radio frequency path similar to that in a conventional coaxial cable. The system provides low attention, low vulnerability to external noise and low radiation of the carrier signal while providing redundant channels—three for ac transmission lines and two for bipolar dc transmission lines.

25 Claims, 18 Drawing Sheets

*Highest Attenuation*
*Highest Radiation*
*Highest Vulnerability to Noise*

*Lower Attenuation*
*Lower Radiation*
*Lower Vulnerability to Noise*

*Lowest Attenuation*
*No Radiation*
*Invulnerable to Noise*

INTRA-BUNDLE POWER LINE CARRIER CURRENT SYSTEM

CROSS REFERENCE TO RELATED APPLICATIONS

This application claims priority of Provisional patent application Ser. No. 60/828,803 filed Oct. 10, 2006, the disclosure of which is incorporated herein by reference.

FIELD OF THE INVENTION

The invention pertains to superimposing radio frequency signals onto the conductors of electric cables or conductors, the primary use of which is to carry electric power; commonly referred to as "Power Line Carrier Current."

BACKGROUND OF THE INVENTION

Since the early 1900's, it has been common to superimpose a radio frequency signal on electric power transmission lines and use that signal for control and communication functions at both ends of the line. Prominent among those functions is the sending of information on current and voltage levels, thus allowing protective relays to judge whether or not to cause circuit breakers to open and take the line out of service.

The radio frequency signal is generally applied between two phases of a three-phase line or between poles on a high voltage dc line. With widely separated conductors of that sort, some of the resulting radio-frequency field is coupled to the earth which, because of its high resistance, causes a gradual loss in radio-frequency signal strength, thus requiring periodic "repeater" stations, i.e. stations which take a weak signal, amplify it, and re-apply it to the line.

For transmission lines of very high voltage and considerable length, the need for many repeater stations poses an economic burden to the power line carrier communication option. Furthermore, the fact that inter-phase or inter-pole transmission requires continuity in two or more conductors makes it difficult to sustain a signal with one conductor out of service. Finally, a transmission medium with widely spaced conductors is quite vulnerable to electrical noise, e.g. the "static" caused by corona or electrical impulses resulting from lightning strokes in the vicinity of the line. All of the foregoing limitations are addressed by the invention.

FIG. 1 shows the configuration of a conventional high voltage three-phase alternating current (ac) power line in which a power-carrying cable (conductor) 1 is suspended by a chain of insulators 4 from a supporting structure 3. It is common to install "shield wires" 2, directly tied to the structure 3 and thereby to ground, to intercept lightning strokes. FIG. 2 shows a similar transmission line configured for high voltage bipolar dc power transmission in which just two cables are required; one for the positive pole and another for the negative. FIG. 3 shows a less common monopole dc power transmission configuration in which current is caused to flow on one cable and return through the earth.

Power transmission lines similar to that shown in FIG. 1 commonly operate at either 50 Hz or 60 Hz; those in FIGS. 2 and 3 at constant (dc) voltage. It is common practice to superimpose radio-frequency (carrier current) signals on the same conductor system so as to provide a means of communication from one end of the line to the other; e.g. current and voltage information necessary to determine when a circuit breaker should disconnect the line from service, e.g. in the event of a short circuit within the line.

The power line carrier signal is normally in the frequency range from 30 to 500 kHz. It is commonly coupled to a three-phase transmission line as illustrated in FIG. 4. In this illustrative example the conductor 1 used on each of three phases of an alternating current line, a, b, and c, are connected to the station bus 7 through circuit breakers 6. The circuit breaker symbol is omitted in subsequent diagrams since it is not germane to the invention. In the example configuration of FIG. 4, wave traps 5 are interposed in phases a and b. These wave traps 5 are tuned to be resonant at the power line carrier radio frequency and therefore to effectively isolate the conductor 1 from the bus 7 at that frequency. The wave traps 5 represent negligible impedance to 50 Hz, 60 Hz or direct current flow.

In FIG. 4 the power line carrier transmitter/receiver 10 is connected to power conductors 1 for phases a and b by means of coupling capacitors 8 which represent a very low impedance to the carrier frequencies but very high impedance to power frequencies or to dc. Reactors (drain coils in this example) 9 present a very high impedance to carrier frequency and therefore allow the radio-frequency signal emanating from the transmitter/receiver 10 to be applied between cables 1 representing a and c phases of the three-phase power line or, conversely the incoming radio frequency signal on cables 1 of phases a and c from the remote line end to be received by the transmitter/receiver 10.

FIG. 5 shows the same coupling principles as FIG. 4 except applied to both positive and negative poles of a bipolar dc transmission line. In this case the power-carrying conductors 1 emanate from the high voltage dc inverter station.

Radio frequency voltage applied to an open conductor system such as shown in FIGS. 1, 2, and 3 create an electrostatic and electromagnetic field around the conductors used for that purpose. A portion of these fields extends to the earth below the transmission line. Unlike conductors 1 which, being made from aluminum, have very low electrical losses, the earth has high electrical resistance. The existence of radio frequency fields within the earth causes high losses. Thus the radio-frequency signal attenuates as it goes down the line. In order that a sufficiently strong signal be received at the remote end of the line, "repeater" stations, an example of which is shown in FIG. 6, are required every 50 miles or so. The repeater station simply transfers the weak radio-frequency signal from the conductor 1 on the left side of the diagram to a repeater device 16 by means of a coupling capacitor 8 and drain coil 9 in a manner previously described. The weak signal is then amplified by the repeater and re-applied to the conductor 1 by a second coupling capacitor 8 and drain coil 9. The wave trap 5 inserts no impedance to power frequency or dc current but isolates the left line section from the right insofar as radio frequency signals are concerned.

In understanding this invention it is useful to consider attenuation and other attributes of radio frequency applied to open-wire conductor systems in somewhat more detail. FIG. 7a shows a radio frequency signal being applied by a sine-wave source connected between two conductors separated by distance "s" and located a distance "H" above the earth. Because of their wide separation, a significant portion of the electric and magnetic field is within the earth, leading to relatively high energy loss and high attenuation. Two other properties of this configuration are important. Widely-spaced conductors also cause the applied radio frequency voltage to be propagated to points far from the line, thus requiring that the applied signal be relatively weak to meet propagation standards. Conversely, externally-generated noise, e.g. static generated by corona on either or both conductors or, on a larger scale, electrical impulses caused by lighting discharges in the vicinity of the line, will superimpose itself on whatever signal is received between widely spaced conductors, thus interfering with the received signal-potentially causing errors in data received. Corona is the result of small and local electrical discharges on the conductor's surface common with high voltage power lines.

FIG. 7b shows a sine-wave radio-frequency signal being applied between two conductors, now in close proximity. In this case the electric field is much more closely contained; the earth's affect on attenuation much less, as are both the external influence of the applied radio frequency and the coupling of noise from external sources.

FIG. 7c shows a hypothetical coaxial configuration for illustrative purposes only, in which the sine-wave radio frequency signal is applied between a center conductor and a concentric surrounding conductor. In this case the earth's poor resistance will have no effect on attenuation, no signal is radiated from the system, and it is invulnerable to externally generated noise.

Many high voltage ac and dc transmission lines use a cluster or bundle of closely-spaced cables for each phase or each pole. FIG. 8 (prior art) shows a bundle comprised of four conductors. A spacer is used to separate each conductor from the others by a distance of about 18 inches. These spacers are positioned every 100 feet or so. There are many designs for such spacers. In FIG. 8, a simplified example, the spacer consists of four rigid spacer bars 14, which hold the primary conductors 11 in place by means of clamps 13. Spacers such as that shown in FIG. 8 hold conductors apart mechanically but normally connect them together electrically.

Four-conductor bundles such as shown in FIG. 8 are common at the highest of today's ac and dc voltages, e.g. 765,000 volts ac and 600,000 volts dc. At higher voltages now in planning and/or construction, as many as eight conductors per bundle are being considered. Subdividing the aluminum represented by each phase or pole into more subconductors reduces corona and the associated electrical and audible noise.

To date, intra-bundle power line carrier transmission has been proposed by transmission of signals between various of the subconductors within a bundle while leaving those conductors arrayed in a circular position and insulating them from one-another.

SUMMARY OF THE INVENTION

The invention is directed to applying radio frequency signals between several conductors within a "phase" of an ac transmission line or a "pole" of a dc transmission line rather than between several phases or poles of such transmission line in a manner that gains the benefits characteristic of co-axial cable. Those benefits include greater transmission distance, less vulnerability to external interference, as well as the ability to carry several redundant channels on the same transmission line.

The invention differs from prior art in one respect in that radio frequency signals are transmitted on a circuit comprised of (1) an outer group of conductors which may or may not be arrayed in a generally circular configuration but are connected in electrical parallel and (2) one or more inner conductors placed at or near the center of the bundle and insulated from the outer conductor group; the resulting configuration approximating the characteristics of a coaxial cable.

It is apparent that the inventive concentric intra-bundle radio frequency carrier current system will allow redundant channels to be established within the same transmission line; one per phase position or pole. It is apparent that such channels may function even when one or more of the outer conductors are grounded, forcing the line (or dc pole) out of service. This invention will also allow a low attenuation channel to be applied to monopole systems as illustrated in FIG. 3, or to bipole dc systems in which the poles, for reliability reasons, are widely separated.

The physical position occupied by each phase of a three phase ac power line is normally interchanged (transposed) at least once over the length of the line in order that phases a, b, and c, all occupy the same physical position on the tower for the same distance. This eliminates electrical unbalance resulting from the lack of electrical symmetry in the configuration of the phases. Points of transposition cause a drop in strength of inter-phase power line carrier signals. However, points of transposition cause no signal loss for signals contained within the bundle itself, as with the inventive intra-bundle power line carrier system.

Noise Vulnerability

Noise on a carrier signal is due largely to atmospheric effects and to corona discharges on the conductor surfaces, the latter being generated on both active conductors and on shield wires. The inventive intra-bundle system will tend to shield the center conductor from externally generated noise in the same sense as a co-axial cable would. That benefit applies equally well to noise generated by corona generated on external conductors of the host conductor bundle itself. A corona discharge on one such conductor will be closely coupled electrostatically and electromagnetically to other conductors within the same bundle. Thus the difference in voltage between any two conductors will be very small.

This invention features a system for transmitting a carrier current having two polarities on a high voltage electric power transmission line, in which the power transmission line comprises multiple phases for an ac transmission line, or multiple poles for a dc transmission line, and in which at least one phase, or one pole, comprises at least three spaced, separate conductors connected in parallel that carry the power being transmitted by that phase or pole, the spaced, separate conductors being arranged in two groups, a first, outer group comprising at least two spaced conductors that lie generally along an outer perimeter, and a second, inner group comprising one or more conductors located within the perimeter. The system comprises a carrier current transmitter for transmitting both polarities of the carrier current, circuitry for electrically connecting one polarity to the first group of conductors within one phase or one pole, and circuitry for electrically connecting the second polarity to the second group of conductors of the same phase or pole.

In an embodiment, the conductors of the first group are essentially equidistant from one another. The conductors of the first group may be essentially equidistant from the second group of conductors. The second group of conductors may be insulated from the first group of conductors so that a radio frequency voltage can be impressed between the two groups, separate and distinct from the power voltage carried by the conductors of both groups in common. The system may further comprise a spacer apparatus that holds the conductors of the first and second groups in place relative to one another. The spacer apparatus may be constructed so that it opens during installation so that it can be coupled to the second group of conductors, and then closes for permanent operation. The system may further comprise a spacer apparatus that insulates the second group of conductors from the first group of conductors so as to provide an intra-bundle path for radio frequency signals between the two conductor groups. The system may further comprise a carrier current receiver electrically connected to the first and second groups of conductors. The transmitter and receiver may be in close proximity to the first and second groups of conductors.

Each phase or each pole may comprise at least three spaced, separate conductors connected in parallel that carry the power being transmitted by that phase or pole, the spaced, separate conductors being arranged in two groups, a first, outer group comprising at least two spaced conductors that lie generally along an outer perimeter, and a second inner group comprising one or more conductors located within the perimeter, the system comprising, for each phase or pole, a carrier current transmitter for transmitting both polarities of the carrier current, circuitry for electrically connecting one polarity to the first group of conductors within one phase or one pole, and circuitry for electrically connecting the second polarity to the second group of conductors of the same phase or pole, to create separate and independent low attenuation radio frequency paths within each phase or each pole, thereby allowing as many independent paths on one transmission line as there are phases or poles on that line.

The circuitry for electrically connecting each polarity to one or more conductors of one phase or one pole may comprises a reactor and a coupling capacitor. The transmitter may be installed at essentially the same voltage as carried by the transmission line. The system may further comprise a line-potential power supply that delivers power to the transmitter. The system may further comprise wireless equipment that transmits information to the carrier current transmitter. The wireless equipment may accomplish optical or rf communications. The outer perimeter may be generally circular. The second group of conductors may be located generally at the center of the generally circular outer perimeter. The second group may comprise a single conductor that is essentially equidistant from each of the conductors of the first group.

Also featured in the invention is a system for transmitting a carrier current having two polarities on a high voltage electric power transmission line, in which the power transmission line comprises multiple phases for an ac transmission line, or multiple poles for a dc transmission line, and in which at least one phase, or one pole, comprises at least three spaced, separate conductors connected in parallel that carry the power being transmitted by that phase or pole, the spaced, separate conductors being arranged in two groups, a first, outer group comprising at least two spaced conductors that lie along a generally circular outer perimeter, and a second, inner group comprising one or more conductors located within the perimeter, in which each of the conductors of the first group are essentially equidistant from one another, and each of the conductors of the first group are also essentially equidistant from the second group of conductors, the system comprising a spacer apparatus that holds the conductors of the first and second groups in place relative to one another and insulates the second group of conductors from the first group of conductors so as to provide an intra-bundle path for radio frequency signals between the two conductor groups, the spacer apparatus adapted to open during installation so that it can be coupled to the second group of conductors, and then close for permanent operation, a carrier current transmitter for transmitting both polarities of the carrier current, circuitry for electrically connecting one polarity to the first group of conductors within one phase or one pole, and circuitry for electrically connecting the second polarity to the second group of conductors of the same phase or pole.

The invention also features a system for transmitting a carrier current having two polarities on a high voltage electric power transmission line, comprising a power transmission line comprising multiple phases for an ac transmission line, or multiple poles for a dc transmission line, at least one phase, or one pole, comprising at least three spaced, separate conductors connected in parallel that carry the power being transmitted by that phase or pole, the spaced, separate conductors being arranged in two groups, a first, outer group comprising at least two spaced conductors that lie along a generally circular outer perimeter, and a second, inner group comprising one or more conductors located within the perimeter, a carrier current transmitter for transmitting both polarities of the carrier current, circuitry for electrically connecting one polarity to the first group of conductors within one phase or one pole, and circuitry for electrically connecting the second polarity to the second group of conductors of the same phase or pole.

Each of the conductors of the first group may be essentially equidistant from one another and are also essentially equidistant from the second group of conductors. The second group of conductors may be insulated from the first group of conductors so that a radio frequency voltage can be impressed between the two groups, separate and distinct from the power voltage carried by the conductors of both groups in common. The system may further comprise a spacer apparatus that holds the conductors of the first and second groups in place relative to one another. The spacer apparatus may be constructed such that it opens during installation so that it can be coupled to the second group of conductors, and then closes for permanent operation. The spacer apparatus may insulate the second group of conductors from the first group of conductors so as to provide an intra-bundle path for radio frequency signals between the two conductor groups.

BRIEF DESCRIPTION OF THE DRAWINGS

Other objects, features and advantages will occur to those skilled in the art from the following description of the preferred embodiments of the invention and the accompanying drawings in which.

DETAILED DESCRIPTION OF THE PREFERRED EMBODIMENTS OF THE INVENTION

Figure 9:
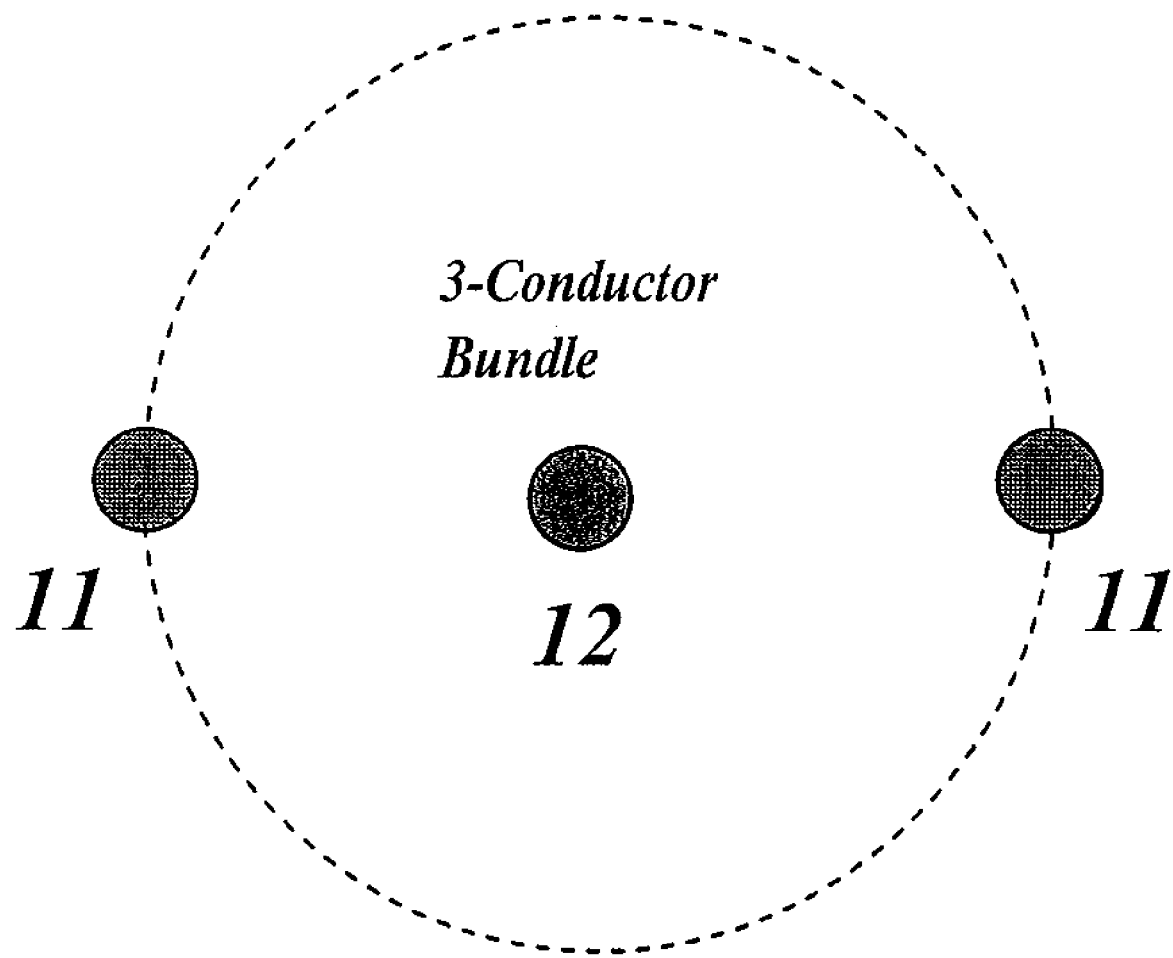
FIG. 9 illustrates a three-conductor bundle that can be used to implement the inventive intra-bundle radio frequency carrier current system.
Figure 10:
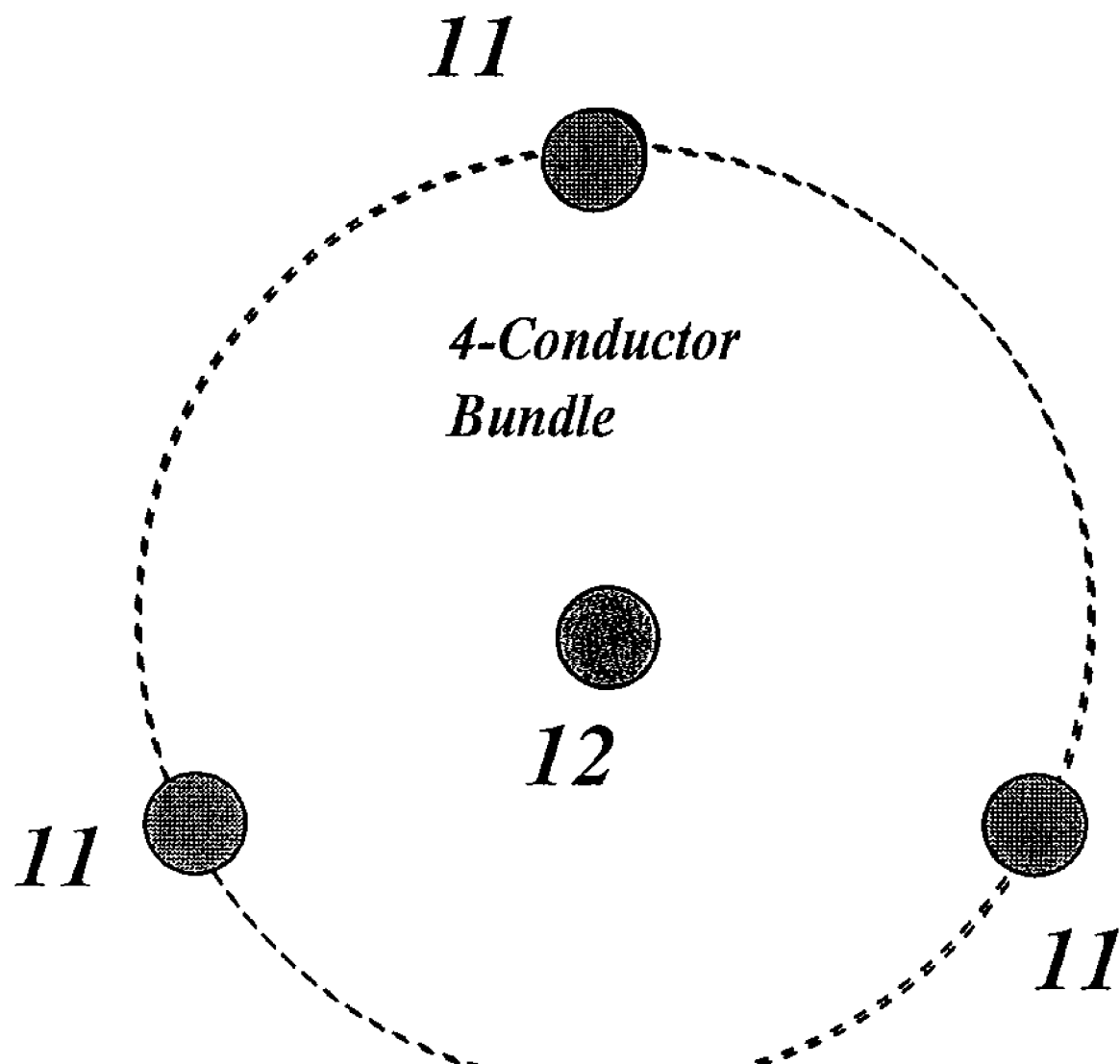
FIG. 10 illustrates a four-conductor bundle that can be used to implement the inventive intra-bundle radio frequency carrier current system.
Figure 11:
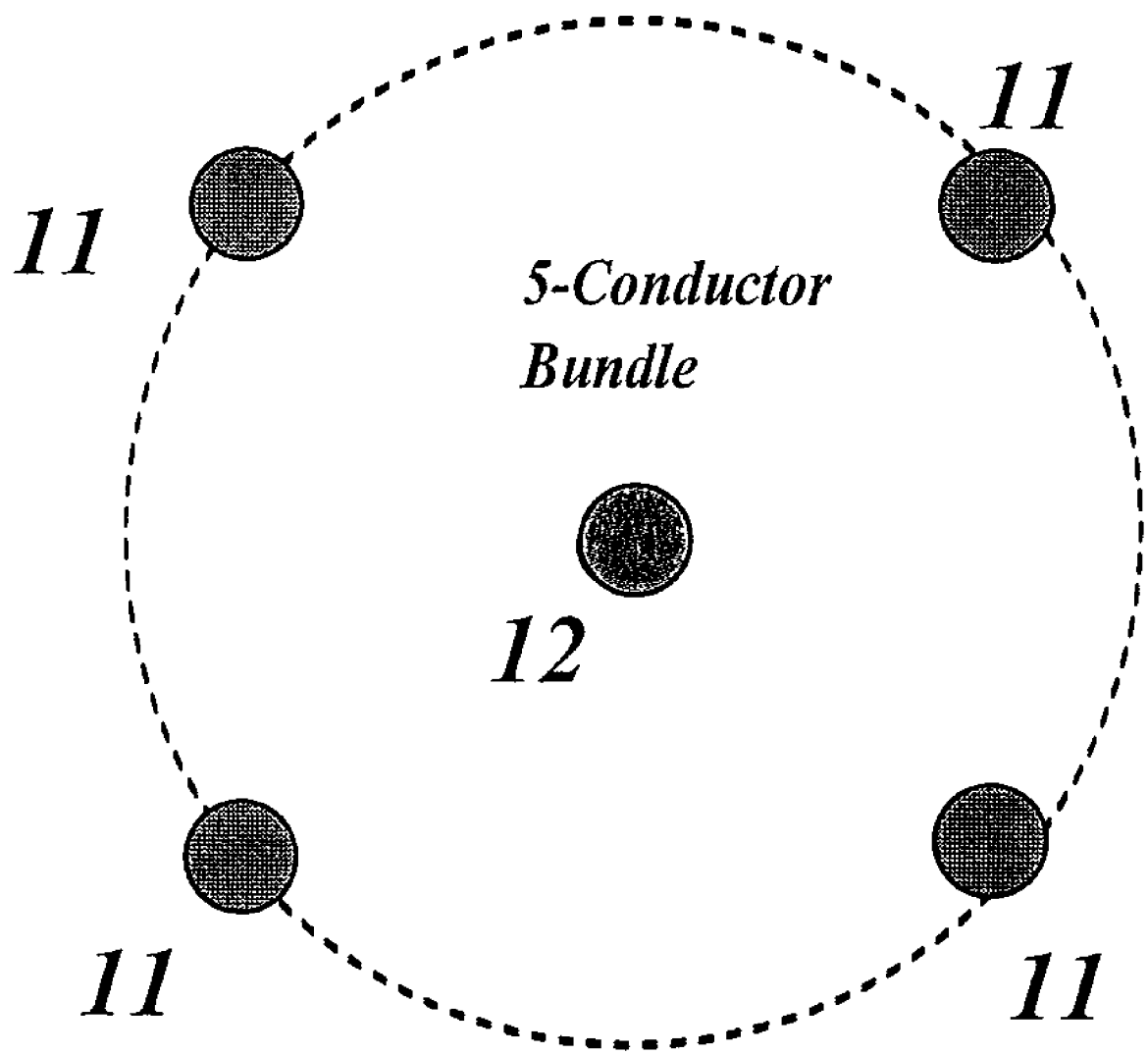
FIG. 11 illustrates a five-conductor bundle that can be used to implement the inventive intra-bundle radio frequency carrier current system.
Figure 12:
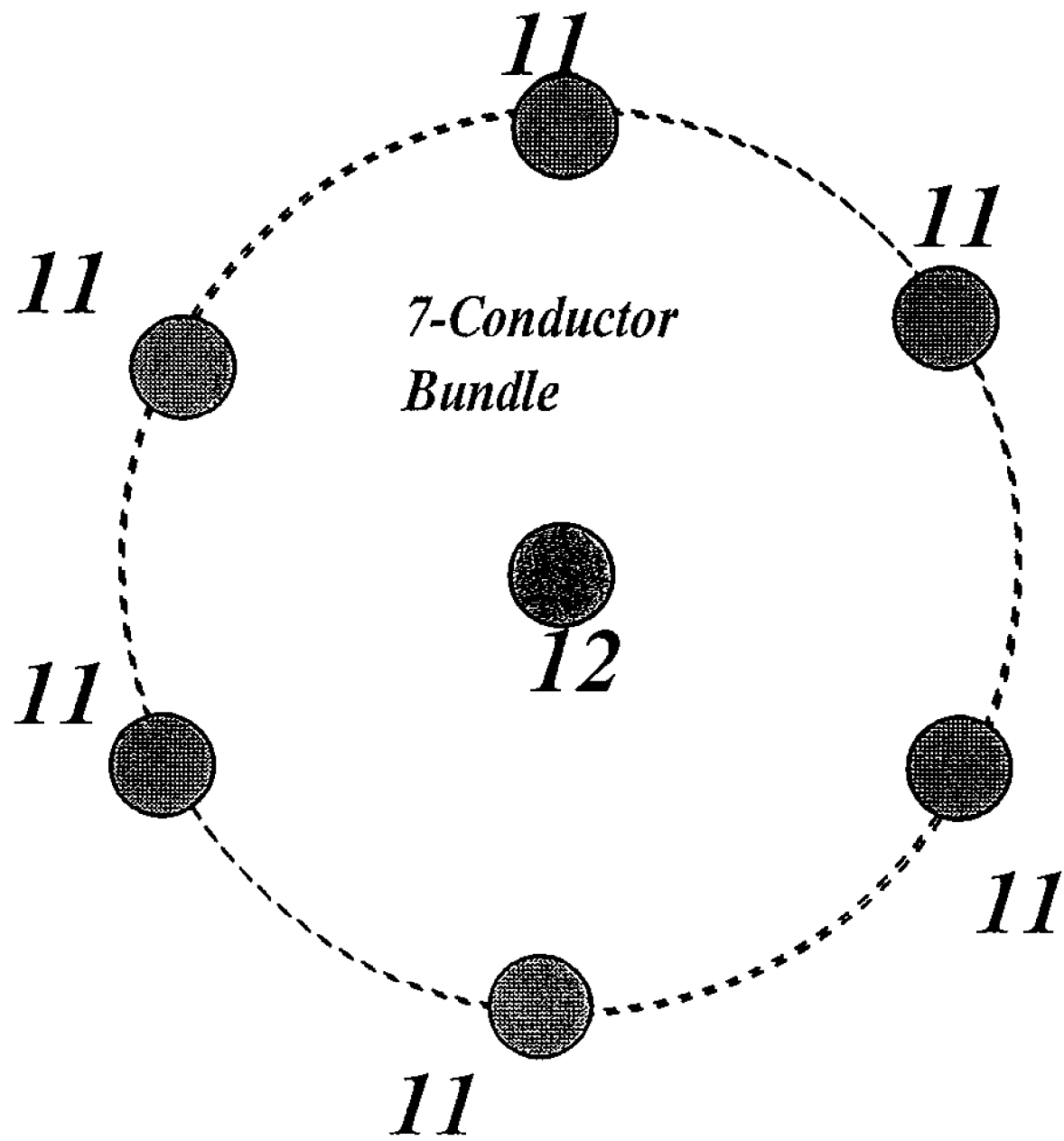
FIG. 12 illustrates a seven-conductor bundle that can be used to implement the inventive intra-bundle radio frequency carrier current system.
Figure 13:
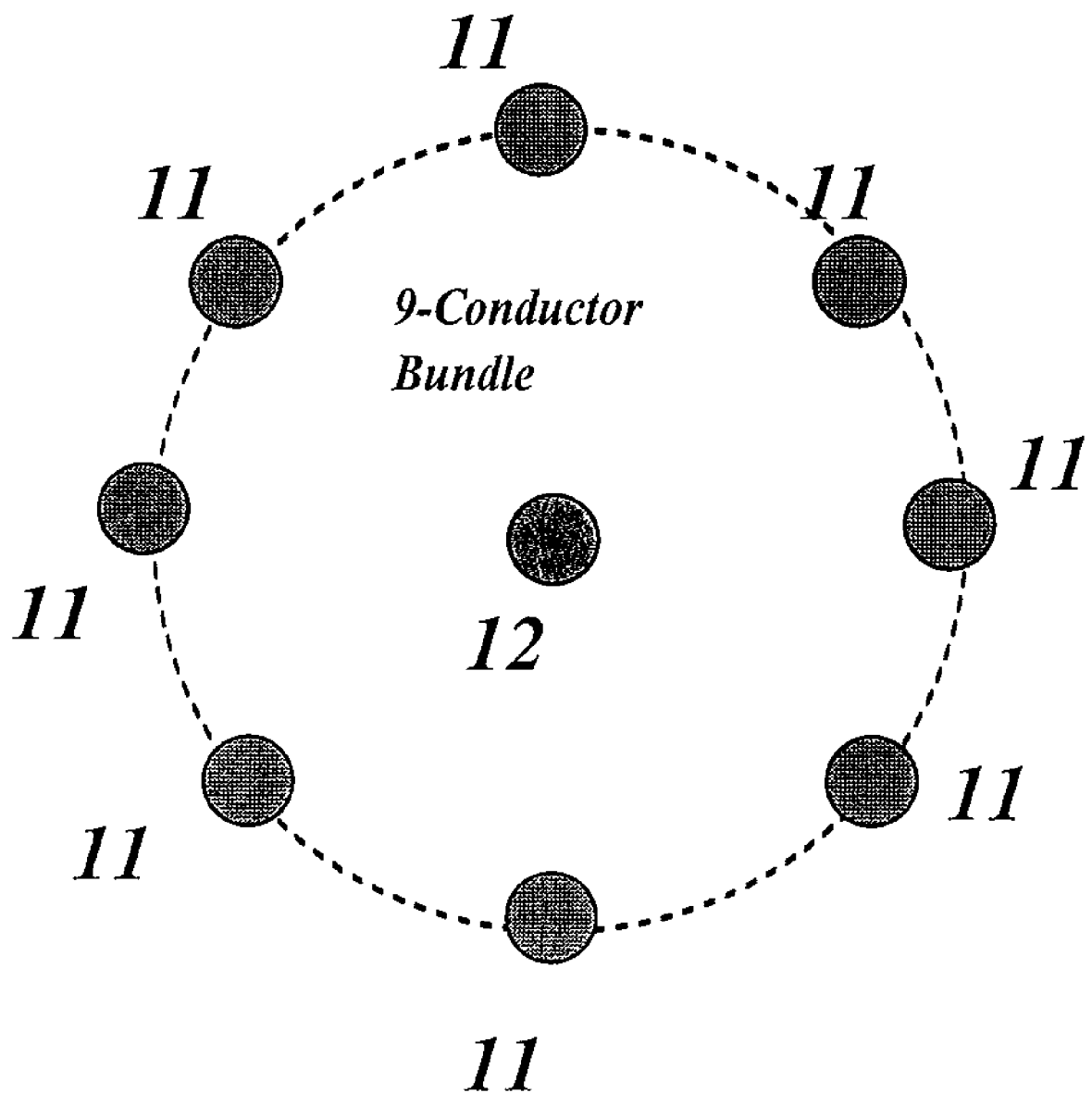
FIG. 13 illustrates a nine-conductor bundle that can be used to implement the inventive intra-bundle radio frequency carrier current system.

FIGS. 9 through 13 illustrate the invention as it applies to bundles of from three to nine conductors per phase in the case where the outer conductors are generally circularly arrayed. In FIG. 9, a three-conductor bundle is accomplished with a central conductor 12, located midway between outer conductors 11 that are arranged in a generally circular configuration as shown by the dotted line. This configuration allows central conductor 12 to comprise one path for radio frequency carrier current energy, and outer conductors 11, connected in parallel, to constitute the return path. FIG. 10 through 13 show corresponding applications extending from four to nine-conductor bundles; the latter coming closest to the properties of a coaxial cable. In each case, the center conductor is insulated from the outer conductors for approximately 100 volts—a voltage sufficient for the radio frequency signal itself. All conductors, including the center conductor 12, will share in carrying power-frequency or dc current while the center conductor 12 represents one side of a conducting path for radio frequency, the outer conductors 11 collectively representing the other side of that path.

Attenuation

Figure 14:
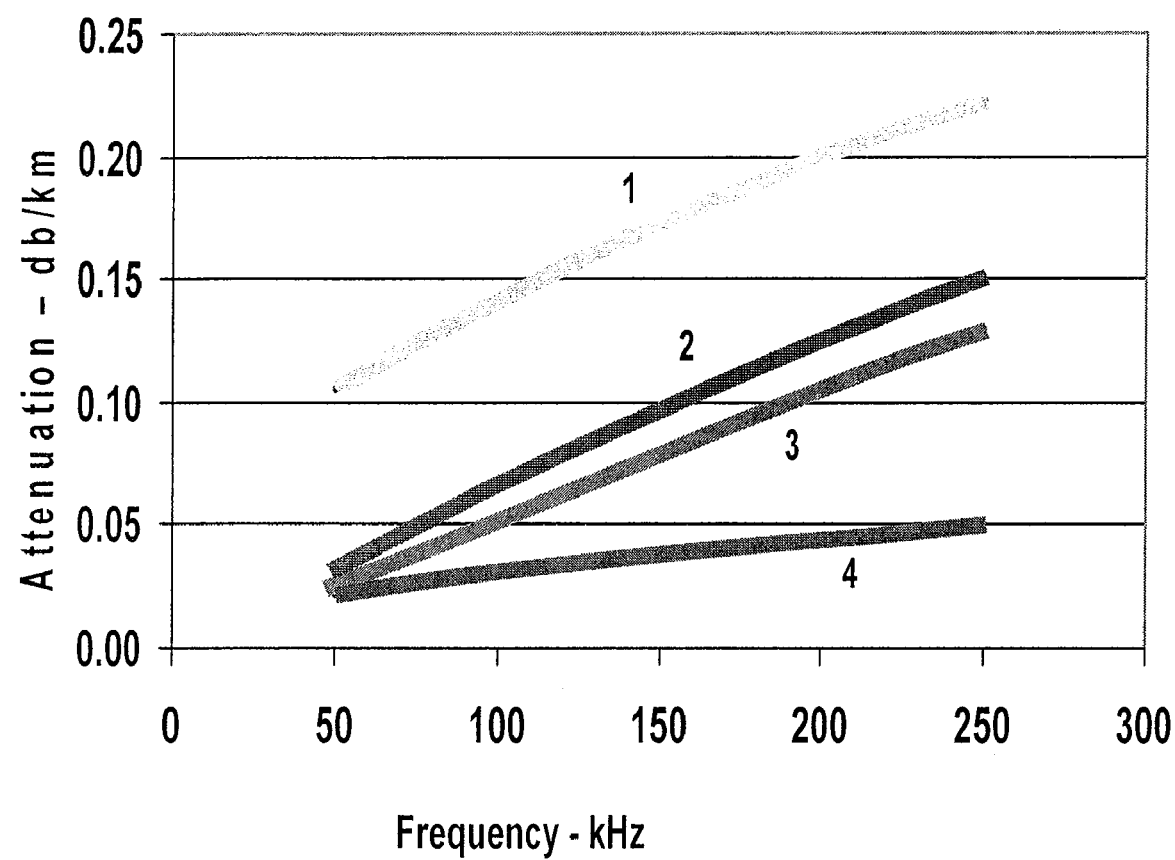
FIG. 14 illustrates the degree to which attenuation can be reduced by the inventive intra-bundle power line carrier system for various frequencies of radio frequency power line carrier current.

Attenuation of radio frequencies on overhead transmission lines is well understood and well reported in the technical literature. Representative calculated values of attenuation are shown in FIG. 14 for (1) propagation of a radio signal between a single eight-conductor bundle and earth, (2) a representative ±800 kV high voltage dc bipole configuration using the same eight-conductor bundle, (3) a second example ±800 kV high voltage dc configuration using the same eight-conductor bundle and (4) for the concentric inventive intra-bundle configuration of FIG. 13 as applied to the same ±800 kV eight-conductor bundle configuration of curves (2) and (3). FIG. 14 shows the inventive intra-bundle configuration to have an advantage of approximately 20% at 50 kHz and 3:1 at 250 kHz. A 3:1 advantage would translate to a corresponding ratio in the spacing of repeater stations. The invention further provides the inherent advantages of higher allowable signal strength and noise rejection.

Figure 15:
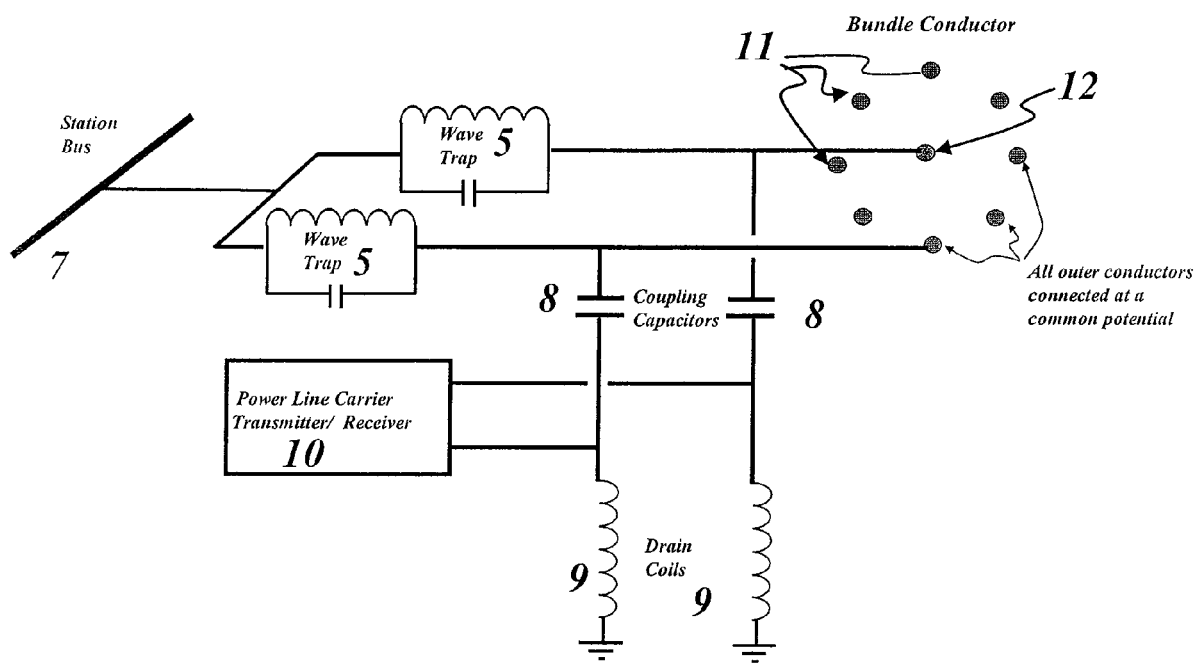
FIG. 15 illustrates, in simplified format, the coupling of a radio frequency power line carrier current signal to or from a transmitter or receiver at ground level to or from the conductor bundle in accordance with the inventive intra-bundle radio frequency carrier current system according to this invention.

FIG. 15 illustrates one preferred embodiment of the invention in which a radio frequency carrier current signal is applied between the center conductor 12 and the outer conductors 11 of a nine-conductor bundle. The outer conductors are connected to one-another and at a common potential. The same principle would apply to bundles comprised of fewer conductors, to bundles in which the outer conductors are arrayed in a contour other than a circle, and to bundles in which more than one conductor is placed inside the contour of the outer conductors to share the inner path of the transmitted radio frequency signal. In FIG. 15 both the center conductor group and the outer conductor group are connected to a common point on the station bus; each through a wave trap 5 to provide radio frequency isolation as cited previously. The radio frequency signal is sent (or received) by the transmitter or receiver 10 via coupling capacitors 8 and drain coils 9 as before, though in this case it is applied to (or received from) a circuit comprised of the group of one or more center conductors and the group of two or more outer conductors; much in the manner of a coaxial cable.

Figure 16:
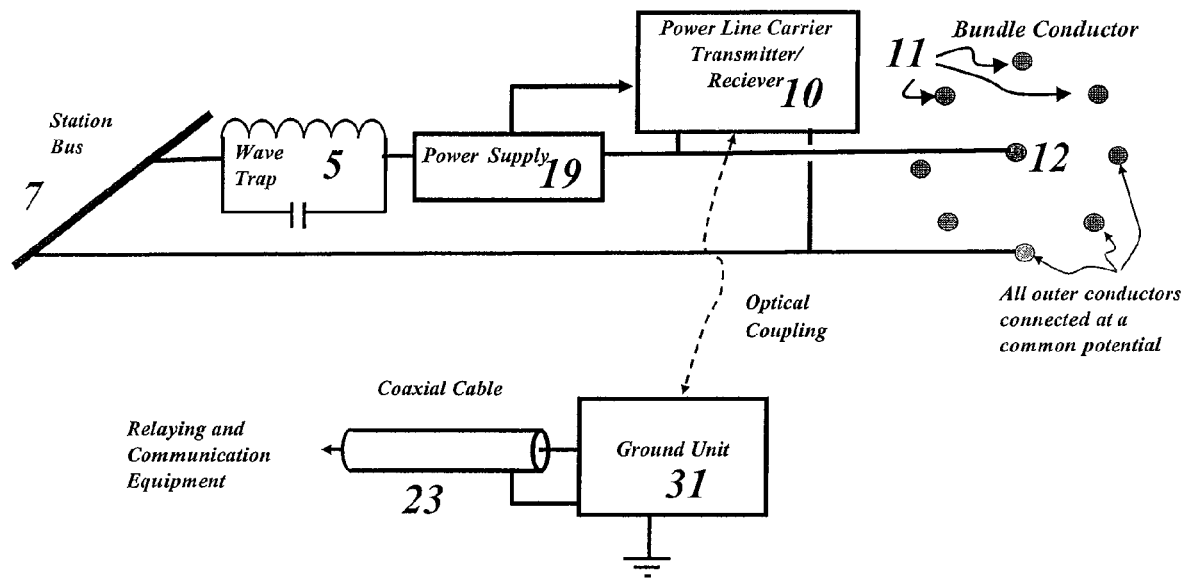
FIG. 16 illustrates, in simplified format, the coupling of a radio frequency power line carrier current signal to or from a transmitter or receiver at full line potential to or from the conductor bundle in accordance with the inventive intra-bundle radio frequency carrier current system according to this invention.

FIG. 15 assumes that the power line carrier transmitter/receiver is at or near ground potential. FIG. 16 shows an alternative embodiment that eliminates the coupling capacitor by placing transmitter/receiver 10 at transmission potential. This presumes that a power supply 19 of sufficient capacity to operating the power line carrier transmitter/receiver is also at line potential. The scheme shown presumes too that the information to be transmitted is sent from a ground unit 31 to transmitter/receiver 10 by optical coupling. Other means, e.g. high frequency radio communication could also be used. A coaxial cable 23 is shown bringing the signal to the substation yard from a control point within the station.

Spacers for Use with the Invention

Figure 1:
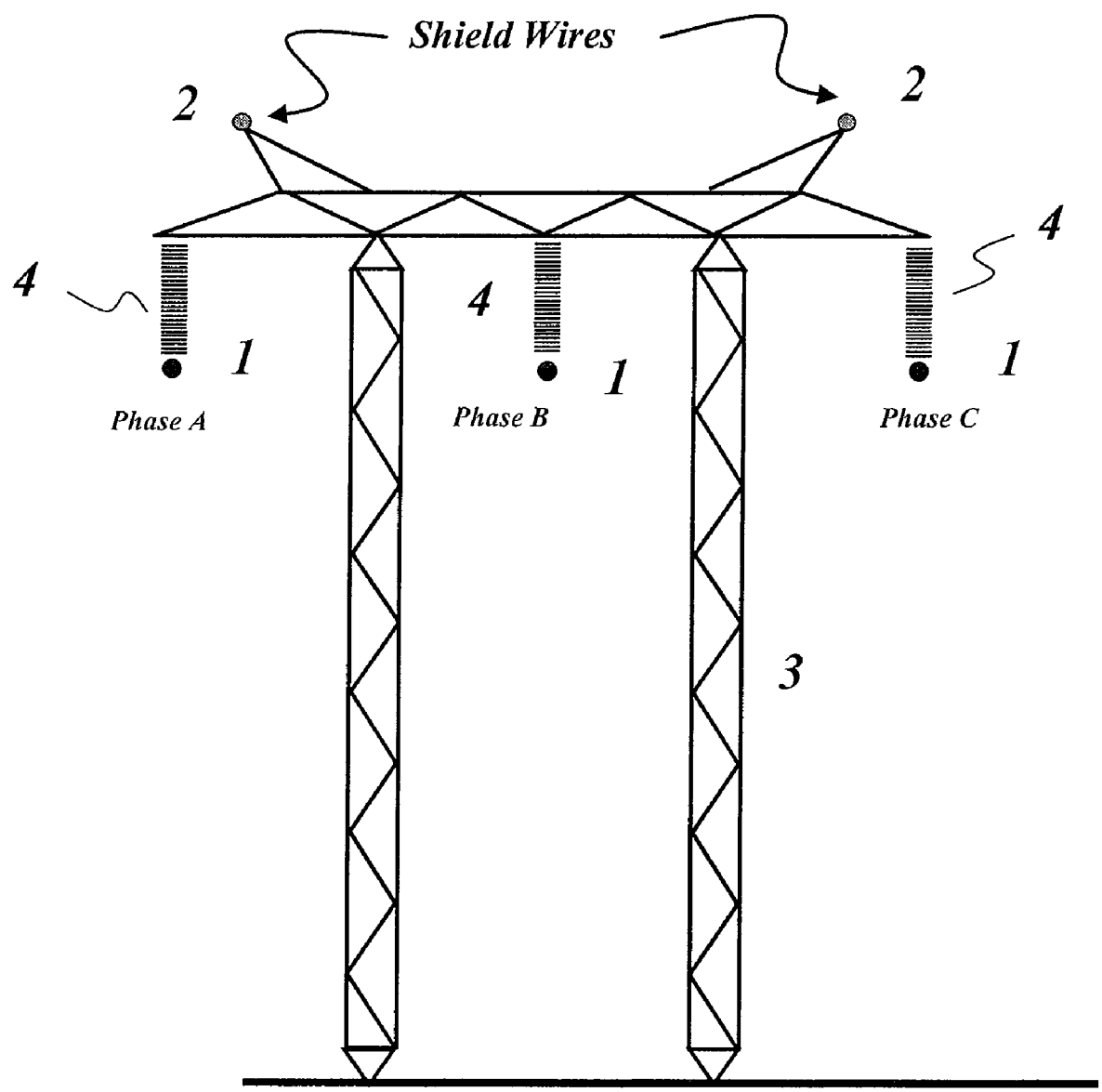
FIG. 1 illustrates a typical three-phase, high-voltage alternating-current power transmission tower.
Figure 2:
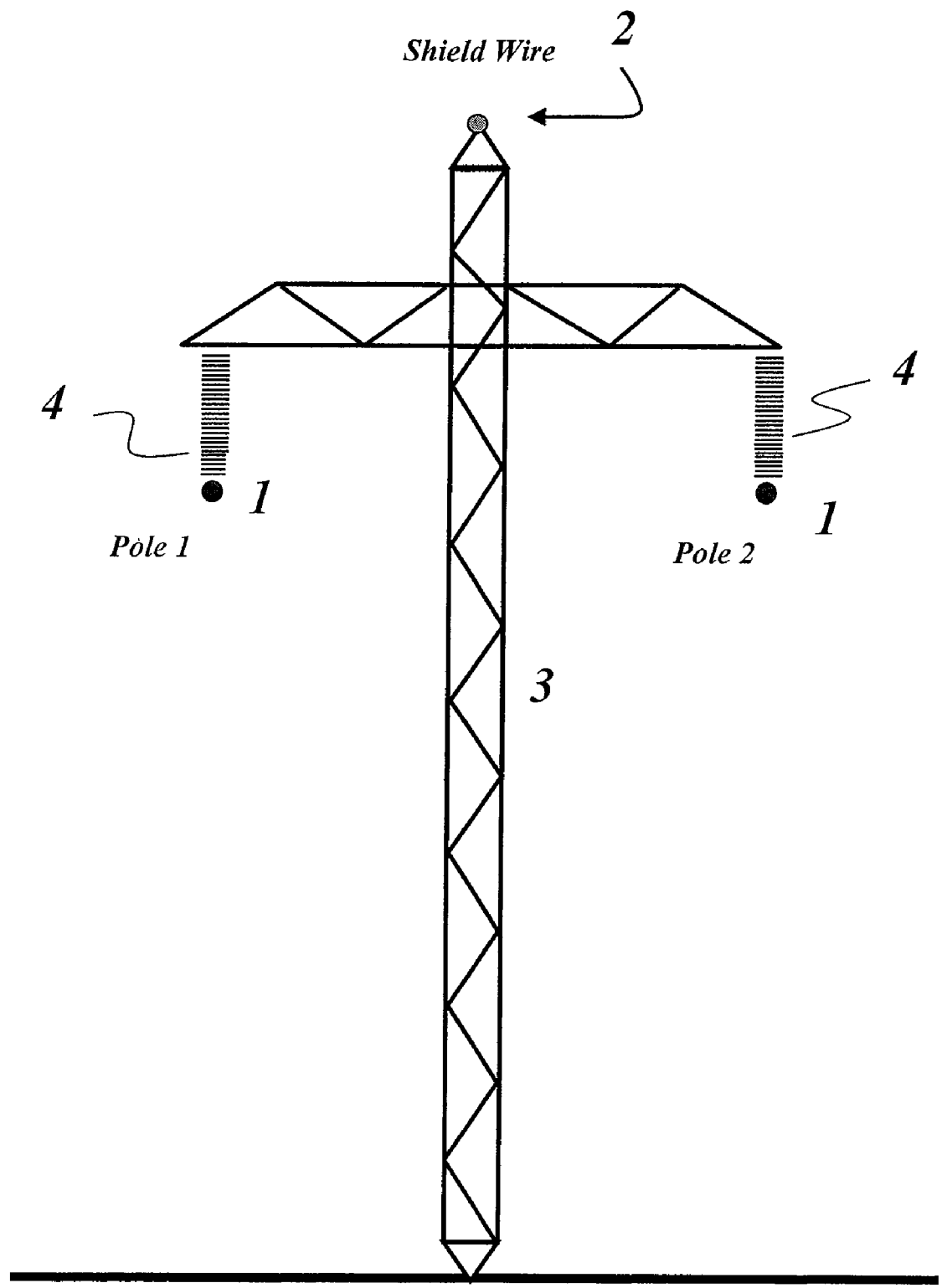
FIG. 2 illustrates a typical bipolar high-voltage direct current power transmission tower.
Figure 3:
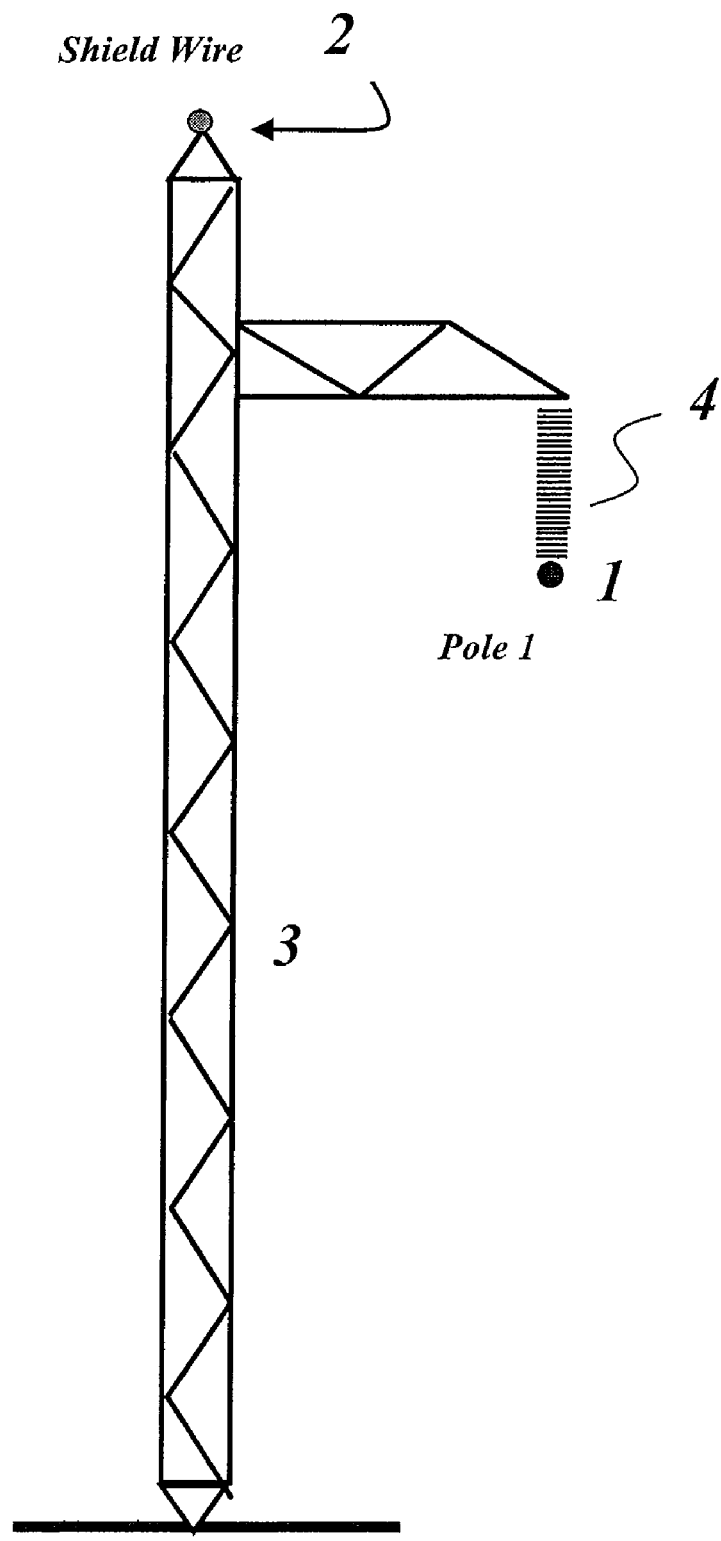
FIG. 3 illustrates a typical monopolar high voltage direct current power transmission tower.
Figure 4:
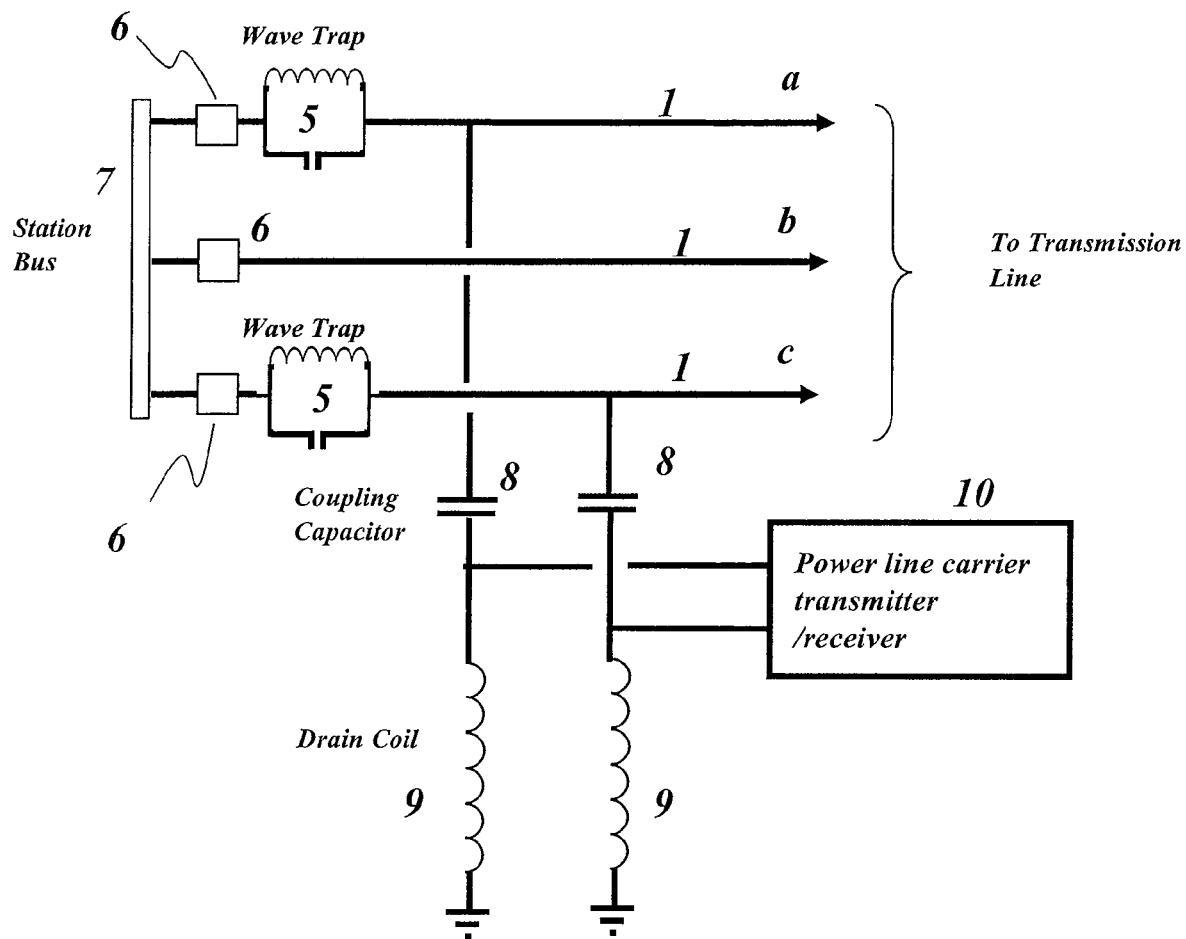
FIG. 4 illustrates, in simplified form, the means of coupling a radio frequency power line carrier current signal onto two phases of a three-phase ac high voltage power line.
Figure 5:
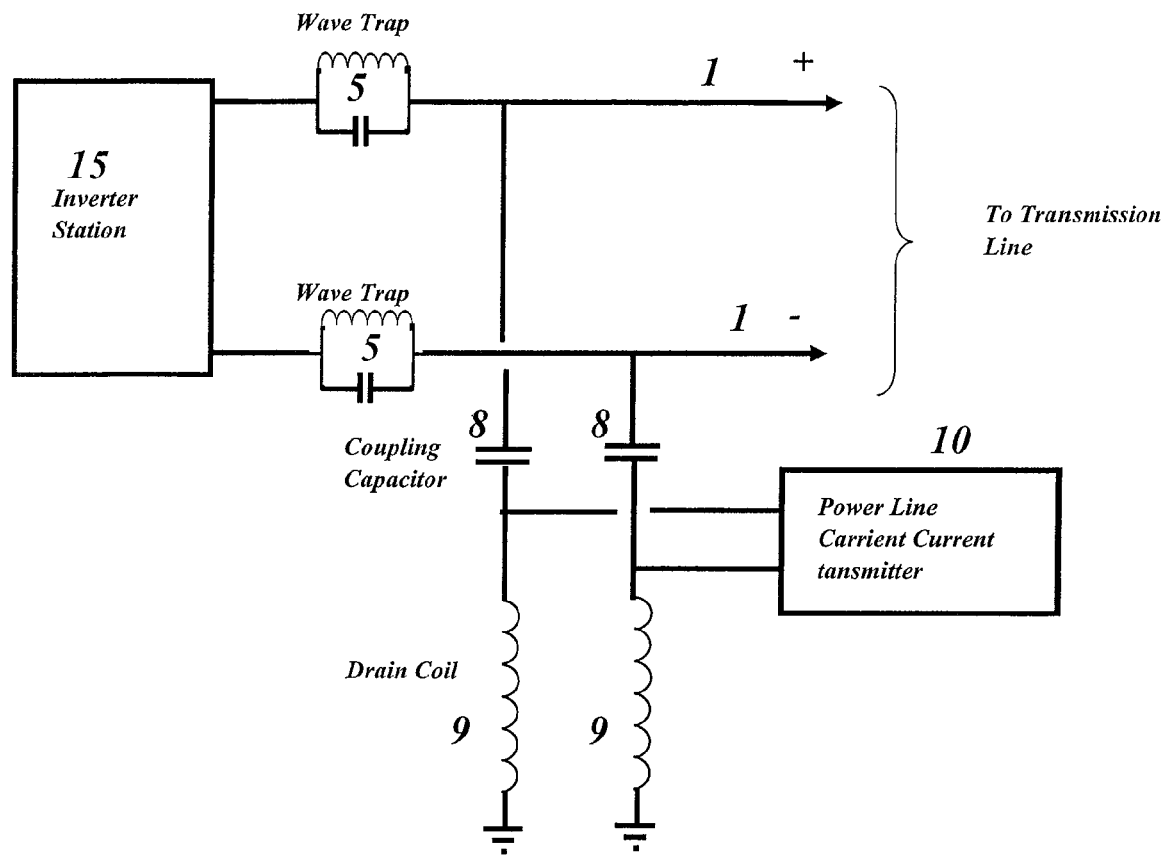
FIG. 5 illustrates, in simplified form, the means of coupling a radio frequency power line carrier current signal onto a bipolar high voltage direct current power line.
Figure 6:
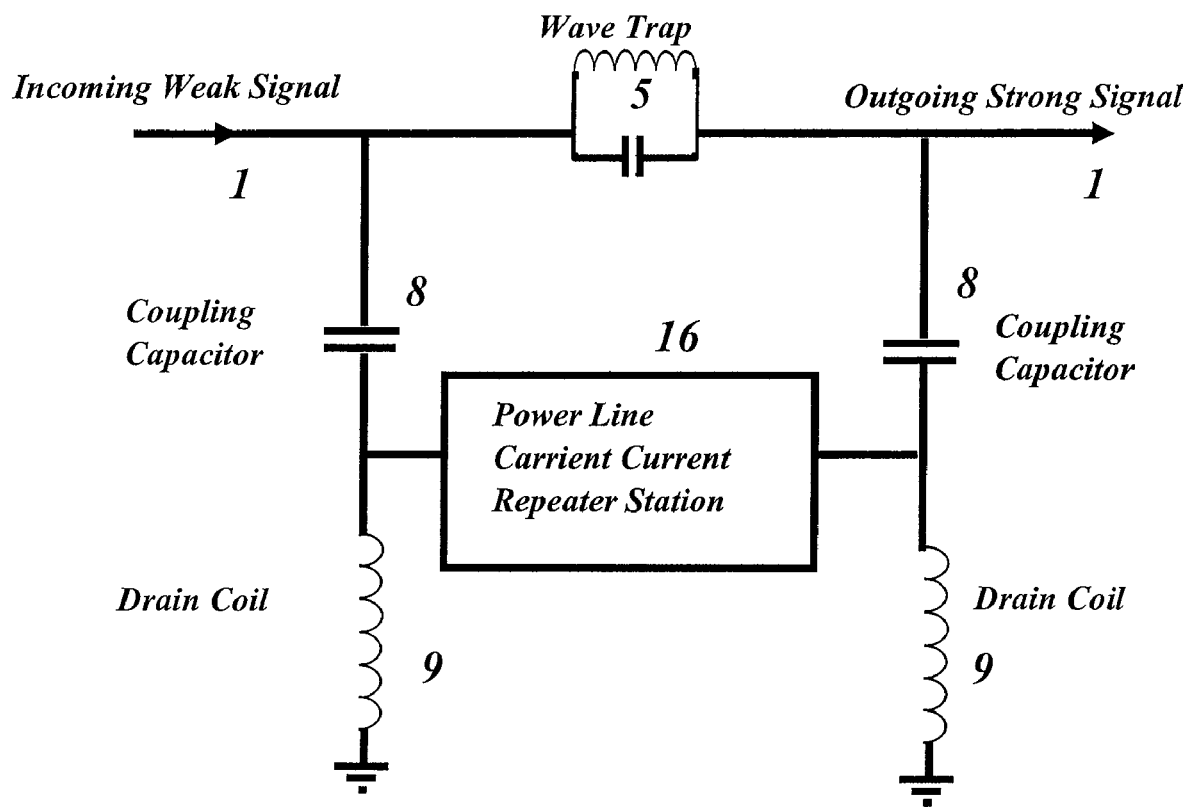
FIG. 6 illustrates, in simplified form, the means by which weak radio frequency signals are restored to fall strength by means of a repeater station.
Figure 7A:
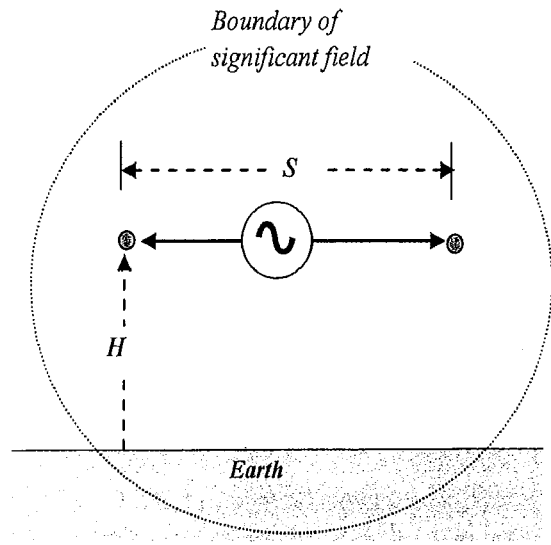
FIG. 7a illustrates the effect of earth proximity in causing high attenuation for inter-bundle or inter-pole radio frequency carrier current signals.
Figure 7B:
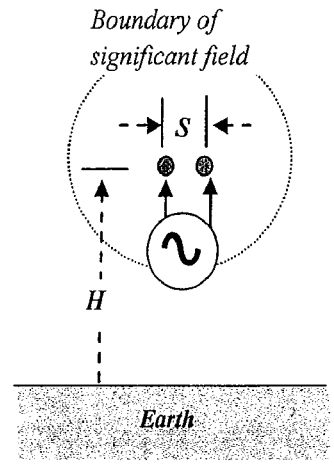
FIG. 7b illustrates reduced coupling to the earth and reduced attenuation when a radio frequency power line carrier signal is applied between two conductors whose inter-conductor distance is small relative to their height above earth.
Figure 7C:
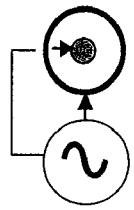
FIG. 7c illustrates that a convention coaxial cable will have very low attenuation, no radiation and very low exposure to noise.
Figure 8:
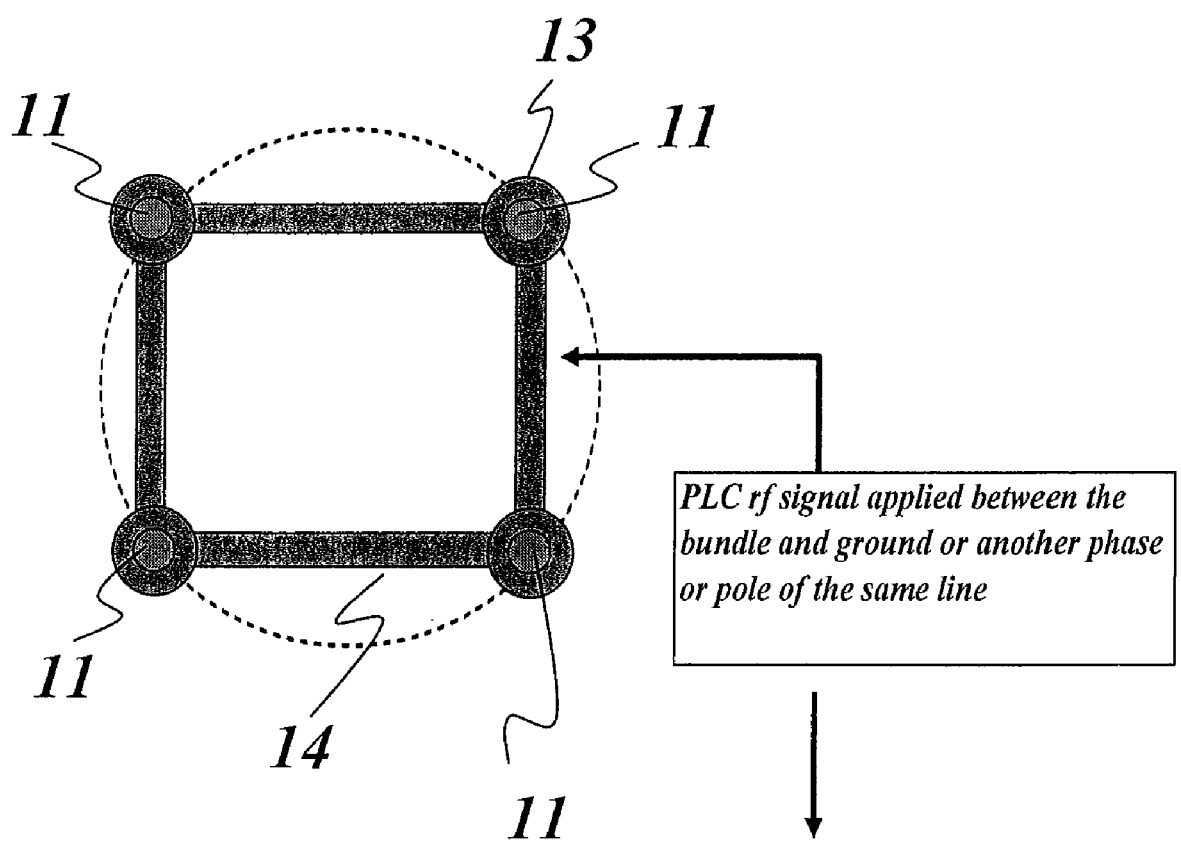
FIG. 8 illustrates an example means of clamping the sub-conductors in a typical four-conductor bundle configuration to maintain their relative position.
Figure 17:
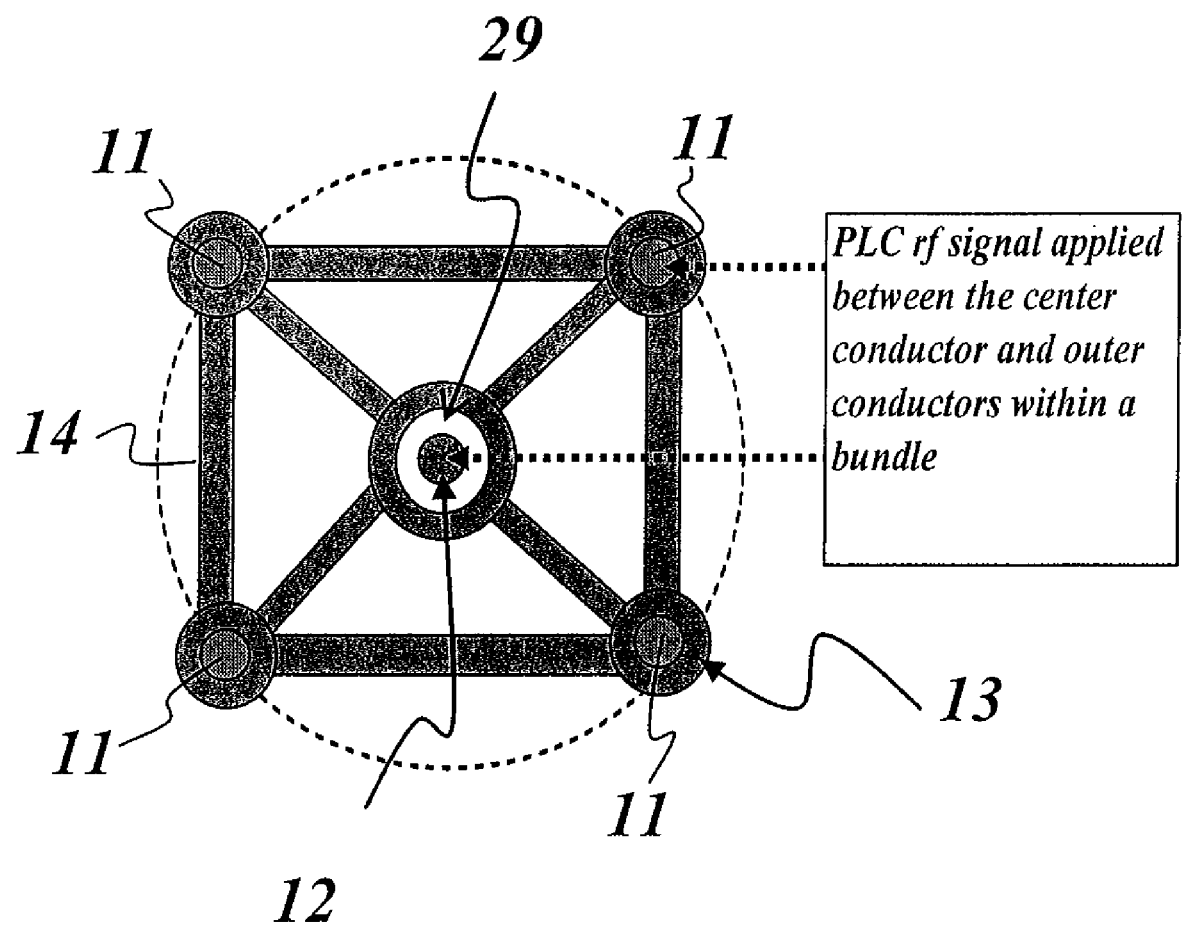
FIG. 17 illustrates a possible sub-conductor configuration for a five-conductor bundle in which the outer conductors are arrayed around a contour surrounding an inner conductor which, in conjunction with the outer conductor array, forms the circuit for the inventive intra-bundle power line carrier system.

FIG. 17 shows one embodiment of the invention relative to a means for supporting the center conductor 12 from the outer conductors 11. In this case a four conductor spacer similar to that illustrated in FIG. 8 is used, the exception being that spacer bars 14 are extended to form an X brace, in the center of which, an insulating spacer 29 allows the center conductor 12 to be at a different radio frequency voltage than the outer conductor group.

Figure 18:
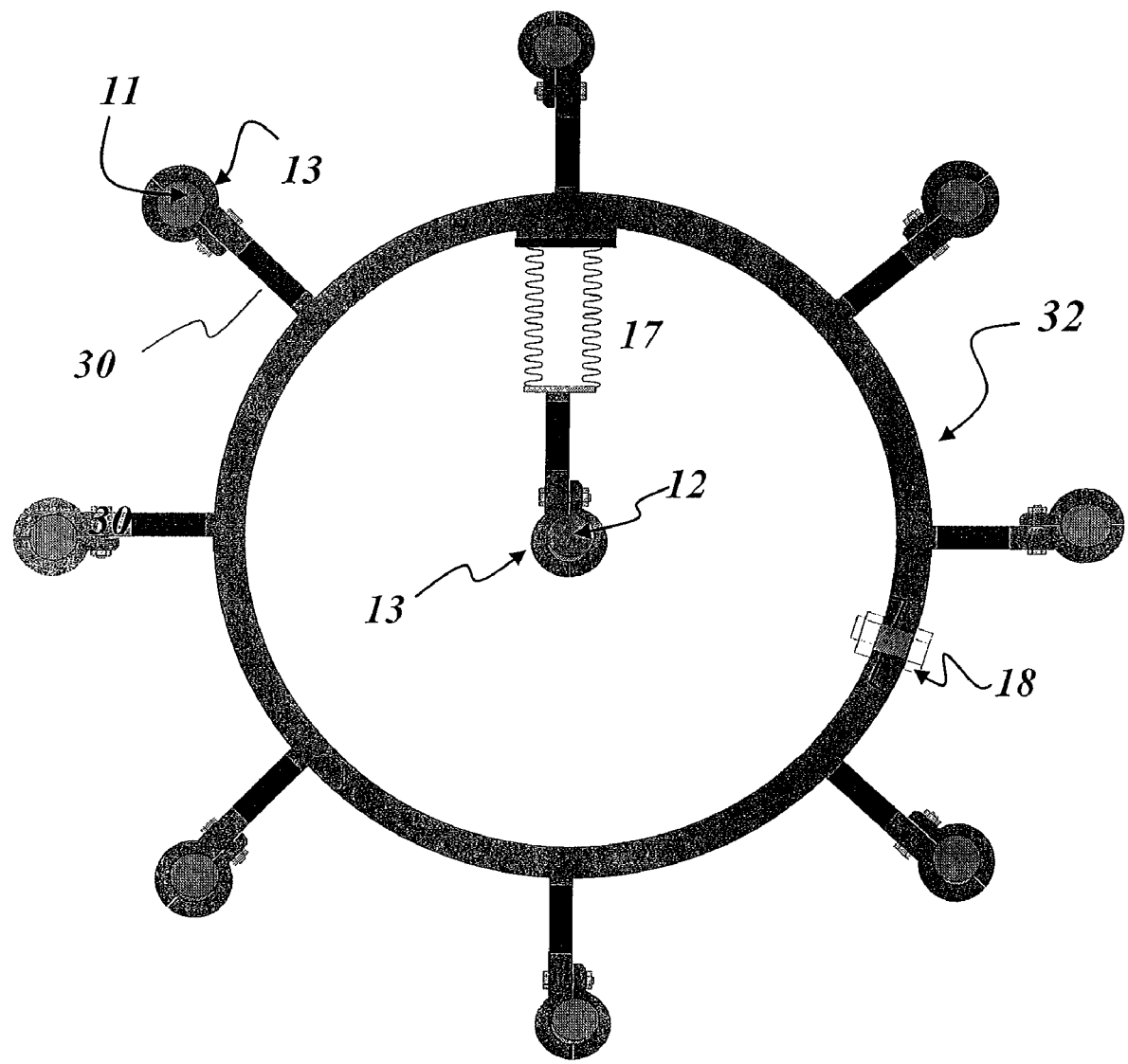
FIG. 18 illustrates, in simplified format, an alternative spacer mechanism to hold the conductors within a nine-conductor bundle in position while providing a low level insulation between the eight outer conductors and the center conductor which, in conjunction with the former, form the path for the inventive intra-bundle radio frequency power line carrier system.

FIG. 18 shows another possible embodiment, in this case for a nine-conductor bundle with one central conductor and eight outer conductors. Outer conductors 11 are held in place by clamps 13 which, in turn, are connected to a central support ring 32 by a stand-off bar 30 which may be of flexible material in order to inhibit vibrations on the outer conductors 11. In this embodiment the center conductor 12 is supported by a rigid insulator 17 that in turn may support a spacer bar 30. The center conductor 12 is clamped to that spacer bar 30 by clamp 13. The central support ring 32 is shown having a split and a closing bolt 18 on the right side, thus allowing it to be opened to admit the center conductor.

Line-Potential Power Supply

If the power line carrier transmitter/receiver or repeater station equipment is at line potential, a variety of line-potential power supply alternatives known in the art can be used. For ac lines from which power can be derived, a current transformer can be used to charge a battery. The battery can provide limited power during line-out conditions. For dc lines, a resistive shunt can be used in a similar manner. Alternatively, a low differential voltage, either ac or dc, can be applied between the center conductor and the outside conductors of the bundle, providing a power source for repeater stations. For repeaters having low power drain, solar panels could be used, those too being supplemented by battery storage.

A variety of modifications to the embodiments described herein will be apparent to those skilled in the art from the disclosure provided herein. It will be apparent to those skilled in the art, for example, that the invention will apply to any number of conductors, greater than two, comprising a bundle. Thus, the invention may be embodied in other specific forms without departing from the spirit or essential attributes thereof.

We claim:

1. A system for transmitting a carrier current having two polarities on a high voltage electric power transmission line, in which the power transmission line comprises multiple phases for an ac transmission line, or multiple poles for a dc transmission line, and in which at least one phase, or one pole, comprises at least three spaced, separate conductors connected in parallel that carry the power being transmitted by that phase or pole, the spaced, separate conductors being arranged in two groups, a first, outer group comprising at least two spaced conductors that lie generally along an outer perimeter, and a second, inner group comprising one or more conductors located within the perimeter, the system comprising:
    a carrier current transmitter for transmitting both polarities of the carrier current;
    circuitry for electrically connecting one polarity to the first group of conductors within one phase or one pole; and
    circuitry for electrically connecting the second polarity to the second group of conductors of the same phase or pole.

2. The system of claim 1 in which each of the conductors of the first group are essentially equidistant from one another.

3. The system of claim 2 in which each of the conductors of the first group are essentially equidistant from the second group of conductors.

4. The system of claim 1 in which the second group of conductors is insulated from the first group of conductors so that a radio frequency voltage can be impressed between the two groups, separate and distinct from the power voltage carried by the conductors of both groups in common.

5. The system of claim 1 further comprising a spacer apparatus that holds the conductors of the first and second groups in place relative to one another.

6. The system of claim 5 in which the spacer apparatus is constructed so that it opens during installation so that it can be coupled to the second group of conductors, and then closes for permanent operation.

7. The system of claim 1 further comprising a spacer apparatus that insulates the second group of conductors from the first group of conductors so as to provide an intra-bundle path for radio frequency signals between the two conductor groups.

8. The system of claim 1 further comprising a carrier current receiver electrically connected to the first and second groups of conductors.

9. The system of claim 8 in which the transmitter and receiver are in close proximity to the first and second groups of conductors.

10. The system of claim 1 in which each phase or each pole comprises at least three spaced, separate conductors connected in parallel that carry the power being transmitted by that phase or pole, the spaced, separate conductors being arranged in two groups, a first, outer group comprising at least two spaced conductors that lie generally along an outer perimeter, and a second inner group comprising one or more conductors located within the perimeter, the system comprising, for each phase or pole:
    a carrier current transmitter for transmitting both polarities of the carrier current;
    circuitry for electrically connecting one polarity to the first group of conductors within one phase or one pole; and
    circuitry for electrically connecting the second polarity to the second group of conductors of the same phase or pole, to create separate and independent low attenuation radio frequency paths within each phase or each pole, thereby allowing as many independent paths on one transmission line as there are phases or poles on that line.

11. The system of claim 1 in which the circuitry for electrically connecting each polarity to one or more conductors of one phase or one pole comprises a reactor and a coupling capacitor.

12. The system of claim 1 in which the transmitter is installed at essentially the same voltage as carried by the transmission line.

13. The system of claim 12 further comprising a line-potential power supply that delivers power to the transmitter.

14. The system of claim 12 further comprising wireless equipment that transmits information to the carrier current transmitter.

15. The system of claim 14 in which the wireless equipment accomplishes optical or rf communications.

16. The system of claim 1 in which the outer perimeter is generally circular.

17. The system of claim 16 in which the second group of conductors is located generally at the center of the generally circular outer perimeter.

18. The system of claim 17 in which the second group comprises a single conductor that is essentially equidistant from each of the conductors of the first group.

19. A system for transmitting a carrier current having two polarities on a high voltage electric power transmission line, in which the power transmission line comprises multiple phases for an ac transmission line, or multiple poles for a dc transmission line, and in which at least one phase, or one pole, comprises at least three spaced, separate conductors connected in parallel that carry the power being transmitted by that phase or pole, the spaced, separate conductors being arranged in two groups, a first, outer group comprising at least two spaced conductors that lie along a generally circular outer perimeter, and a second, inner group comprising one or more conductors located within the perimeter, in which each of the conductors of the first group are essentially equidistant from one another, and each of the conductors of the first group are essentially equidistant from the second group of conductors, the system comprising:

a spacer apparatus that holds the conductors of the first and second groups in place relative to one another and insulates the second group of conductors from the first group of conductors so as to provide an intra-bundle path for radio frequency signals between the two conductor groups, the spacer apparatus constructed so that it opens during installation so that it can be coupled to the second group of conductors, and then closes for permanent operation;

a carrier current transmitter for transmitting both polarities of the carrier current;

circuitry for electrically connecting one polarity to the first group of conductors within one phase or one pole; and circuitry for electrically connecting the second polarity to the second group of conductors of the same phase or pole.

20. A system for transmitting a carrier current having two polarities on a high voltage electric power transmission line, comprising:

a power transmission line comprising multiple phases for an ac transmission line, or multiple poles for a dc transmission line, at least one phase, or one pole, comprising at least three spaced, separate conductors connected in parallel that carry the power being transmitted by that phase or pole, the spaced, separate conductors being arranged in two groups, a first, outer group comprising at least two spaced conductors that lie along a generally circular outer perimeter, and a second, inner group comprising one or more conductors located within the perimeter;

a carrier current transmitter for transmitting both polarities of the carrier current;

circuitry for electrically connecting one polarity to the first group of conductors within one phase or one pole; and circuitry for electrically connecting the second polarity to the second group of conductors of the same phase or pole.

21. The system of claim 20 in which each of the conductors of the first group are essentially equidistant from one another and are essentially equidistant from the second group of conductors.

22. The system of claim 21 in which the second group of conductors is insulated from the first group of conductors so that a radio frequency voltage can be impressed between the two groups, separate and distinct from the power voltage carried by the conductors of both groups in common.

23. The system of claim 22 further comprising a spacer apparatus that holds the conductors of the first and second groups in place relative to one another.

24. The system of claim 23 in which the spacer apparatus is designed so that it opens during installation so that it can be coupled to the second group of conductors, and then closes for permanent operation.

25. The system of claim 23 in which the spacer apparatus insulates the second group of conductors from the first group of conductors so as to provide an intra-bundle path for radio frequency signals between the two conductor groups.

* * * * *